United States Patent
Gobara

(10) Patent No.: US 9,627,752 B2
(45) Date of Patent: Apr. 18, 2017

(54) RECEIVING UNIT DRIVING CONTROL METHOD, RECEIVING DEVICE AND ELECTRONIC APPARATUS

(71) Applicant: Seiko Epson Corporation, Tokyo (JP)

(72) Inventor: Naoki Gobara, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 883 days.

(21) Appl. No.: 13/869,792

(22) Filed: Apr. 24, 2013

(65) Prior Publication Data

US 2013/0285854 A1  Oct. 31, 2013

(30) Foreign Application Priority Data

Apr. 25, 2012 (JP) ................. 2012-099755

(51) Int. Cl.
*G01S 19/34* (2010.01)
*H04W 52/02* (2009.01)
*H01Q 3/24* (2006.01)

(52) U.S. Cl.
CPC ............. *H01Q 3/24* (2013.01); *G01S 19/34* (2013.01); *H04W 52/028* (2013.01); *H04W 52/0274* (2013.01); *Y02B 60/50* (2013.01)

(58) Field of Classification Search
CPC ...................................................... G01S 19/34
See application file for complete search history.

(56) References Cited

U.S. PATENT DOCUMENTS

| | | | |
|---|---|---|---|
| 688,887 A | 12/1901 | Schottenfels | |
| 5,650,785 A * | 7/1997 | Rodal | G01S 19/34 342/352 |
| 5,949,812 A * | 9/1999 | Turney | G01S 19/34 370/311 |
| 8,634,504 B2 | 1/2014 | Terashima et al. | |
| 8,737,363 B2 | 5/2014 | Ozluturk et al. | |
| 8,755,472 B2 | 6/2014 | Sun et al. | |
| 2003/0081660 A1 | 5/2003 | King et al. | |
| 2004/0202235 A1 | 10/2004 | Kohli et al. | |

(Continued)

FOREIGN PATENT DOCUMENTS

| | | |
|---|---|---|
| CN | 1543714 A | 11/2004 |
| JP | 2001-042023 A | 2/2001 |
| JP | 2001/042023 A | 2/2001 |
| JP | 2001-159670 A | 6/2001 |
| JP | 2002-530974 A | 9/2002 |

(Continued)

OTHER PUBLICATIONS

Non-Final Office Action in related U.S. Appl. No. 14/109,807, dated Nov. 3, 2014.

(Continued)

*Primary Examiner* — Gregory C Issing
(74) *Attorney, Agent, or Firm* — Kilpatrick Townsend & Stockton LLP

(57) ABSTRACT

An RF receiving circuit unit that receives a GPS satellite signal from a GPS satellite is intermittently driven by a first driving control of intermittently driving the RF receiving circuit unit with a first intermittent driving pattern and a multistage driving control of intermittently driving the RF receiving circuit unit with a multistage intermittent driving pattern in which a driving period in the first intermittent driving pattern is set to a second intermittent driving pattern of which an intermittent cycle is shorter than that of the first intermittent driving pattern.

10 Claims, 10 Drawing Sheets

(56) References Cited

U.S. PATENT DOCUMENTS

| | | | |
|---|---|---|---|
| 2009/0168843 A1* | 7/2009 | Waters | G01S 19/34 375/130 |
| 2009/0168853 A1 | 7/2009 | Gobara | |
| 2009/0309792 A1* | 12/2009 | Hanabusa | G01S 19/34 342/357.63 |
| 2010/0039316 A1* | 2/2010 | Gronemeyer | G01S 19/34 342/357.48 |
| 2011/0254732 A1 | 10/2011 | Martin et al. | |
| 2012/0202428 A1 | 8/2012 | Mirbaha et al. | |
| 2013/0084845 A1 | 4/2013 | Kimura et al. | |
| 2015/0289206 A1 | 10/2015 | Kimura et al. | |

FOREIGN PATENT DOCUMENTS

| | | |
|---|---|---|
| JP | 2003-504909 A | 2/2003 |
| JP | 2005-500731 A | 1/2005 |
| JP | 2009/175123 A | 8/2009 |
| JP | 2011-022098 | 2/2011 |
| JP | 2012-010202 A | 1/2012 |
| WO | 00/31659 A1 | 6/2000 |
| WO | 01/03294 A1 | 1/2001 |

OTHER PUBLICATIONS

Yoo, Jae-Chern, et al, "1-D fast normalized cross-correlation using additions," Digital Signal Processing, Academic Press, Orlando, FL, USA, vol. 20, No. 5, Sep. 1, 2010, pp. 1482-1493.
World's smallest and thinnest 0.15×0.15 mm, 7.5 micro meter thick RFID IC chip. Hitachi, Ltd Feb. 2006.

* cited by examiner

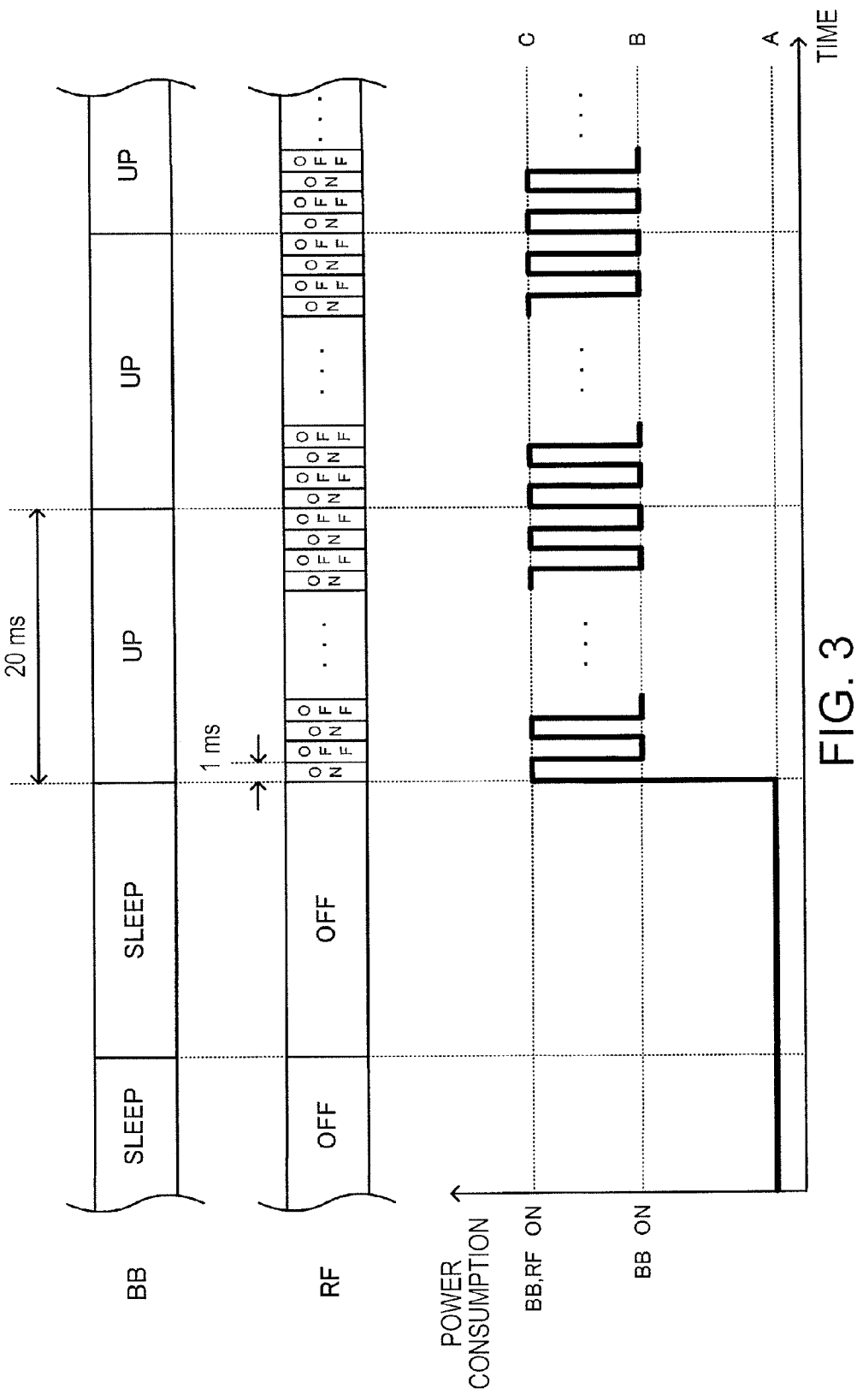

| EPHEMERIS | FIX STATE | RECEIVED SIGNAL INTENSITY | OPERATING MODE |
|---|---|---|---|
| ABSENCE | BEFORE | $P \leq \theta 10$ | NORMAL MODE |
| | | $\theta 10 < P$ | SECOND POWER SAVING MODE |
| | AFTER | $P \leq \theta 20$ | NORMAL MODE |
| | | $\theta 20 < P < \theta 30$ | FIRST POWER SAVING MODE |
| | | $\theta 30 \leq P$ | THIRD POWER SAVING MODE |
| PRESENCE | BEFORE | — | NORMAL MODE |
| | AFTER | $P \leq \theta 20$ | NORMAL MODE |
| | | $\theta 20 < P < \theta 30$ | FIRST POWER SAVING MODE |
| | | $\theta 30 \leq P$ | THIRD POWER SAVING MODE |

FIG. 4

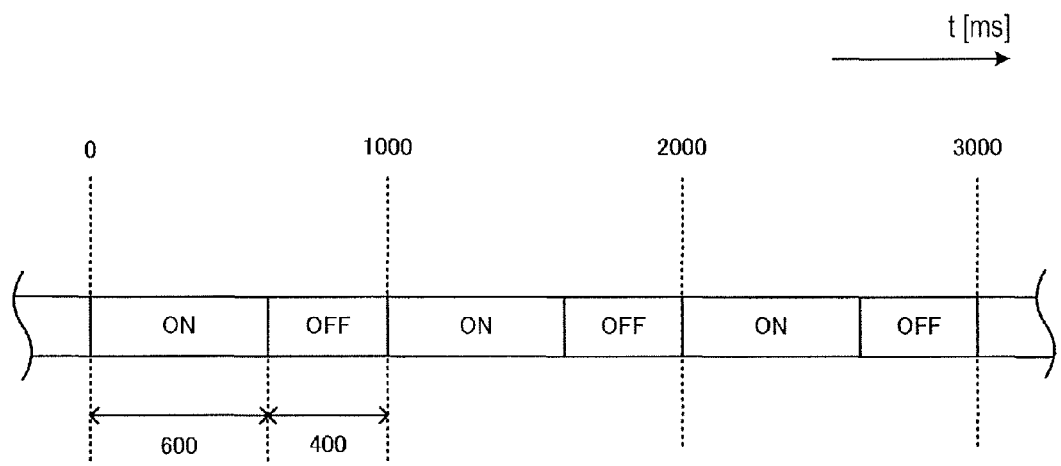

FIG. 5

| OPERATING MODE | RECEIVED SIGNAL INTENSITY | FIRST DUTY RATIO (UP(ON):SLEEP(OFF)) |
|---|---|---|
| FIRST POWER SAVING MODE | $\theta 20 < P < \theta 21$ | 0.9:0.1 (900 ms:100 ms) |
| | $\theta 21 \leq P < \theta 22$ | 0.8:0.2 (800 ms:200 ms) |
| | ⋮ | ⋮ |
| | $\theta 28 \leq P < \theta 30$ | 0.1:0.9 (100 ms:900 ms) |

| OPERATING MODE | RECEIVED SIGNAL INTENSITY | SECOND DUTY RATIO (ON:OFF) |
|---|---|---|
| SECOND POWER SAVING MODE | $\theta 10 < P < \theta 12$ | 0.8:0.2 (16 ms:4 ms) |
| | $\theta 12 \leq P < \theta 14$ | 0.6:0.4 (12 ms:8 ms) |
| | $\theta 14 \leq P < \theta 16$ | 0.4:0.6 (8 ms:12 ms) |
| | $\theta 16 \leq P$ | 0.2:0.8 (4 ms:16 ms) |

FIG.11

| OPERATING MODE | RECEIVED SIGNAL INTENSITY | FIRST DUTY RATIO (UP(ON):SLEEP(OFF)) | SECOND DUTY RATIO (ON:OFF) |
|---|---|---|---|
| FIRST POWER SAVING MODE | θ20<P<θ22 | 9:1 (900 ms:100 ms) | — |
| | θ22≦P<θ24 | 8:2 (800 ms:200ms) | — |
| | θ24≦P<θ26 | 7:3 (700 ms:300 ms) | — |
| | θ26≦P<θ28 | 6:4 (600 ms:400 ms) | — |
| | θ28≦P<θ30 | 5:5 (500 ms:500 ms) | — |
| THIRD POWER SAVING MODE | θ30≦P<θ32 | 4:6 (400 ms:600 ms) | 8:2 (16 ms:4 ms) |
| | θ32≦P<θ34 | 3:7 (300 ms:700 ms) | 6:4 (12 ms:8 ms) |
| | θ34≦P<θ36 | 2:8 (200 ms:800 ms) | 4:6 (8 ms:12 ms) |
| | θ36≦P | 1:9 (100 ms:900 ms) | 2:8 (4 ms:16 ms) |

FIG.12

RECEIVING UNIT DRIVING CONTROL METHOD, RECEIVING DEVICE AND ELECTRONIC APPARATUS

This application claims priority to Japanese Patent Application No. 2012-099755, filed Apr. 25, 2012, the entirety of which is hereby incorporated by reference.

BACKGROUND

1. Technical Field

The present invention relates to a method of controlling driving of a receiving unit that receives a satellite signal from a positioning satellite, and the like.

2. Related Art

A global positioning system (GPS) is widely known as a positioning system using a positioning signal and is used for a receiving device built in a mobile phone, a car navigation apparatus, and the like. In the GPS, positions of plural GPS satellites, pseudo-distances from plural GPS satellites to a receiving device, and the like are calculated using the clocked time of a GPS receiver and a position calculating operation is finally performed.

Among such GPS receivers, a GPS receiver is known which performs an intermittent position calculating (intermittent positioning) operation by alternating a period in which the position calculating operation is performed and a period in which the position calculating operation is not performed for the purpose of reducing power consumption (for example, see JP-A-2001-42023 and JP-A-2009-175123).

The techniques disclosed in JP-A-2001-42023 and JP-A-2009-175123 are based on an idea that power saving is realized by lowering the position calculating frequency with attention to a position calculating operation using a received satellite signal. However, there is a need for saving more power.

SUMMARY

An advantage of some aspects of the invention is to provide a new technique of realizing more power saving of a receiver that receives a satellite signal.

A first aspect of the invention is directed to a receiving unit driving control method including: a first driving control of intermittently driving a receiving unit, which receives a satellite signal from a positioning satellite, with a first intermittent driving pattern; and a multistage driving control of intermittently driving the receiving unit with a multistage intermittent driving pattern in which a driving period in the first intermittent driving pattern is set to a second intermittent driving pattern of which an intermittent cycle is shorter than that of the first intermittent driving pattern.

As another aspect, the invention may be configured as a receiving device including: a receiving unit that receives a satellite signal from a positioning satellite; and a control unit that controls driving of the receiving unit by switching a driving control between a first driving control of intermittently driving the receiving unit with a first intermittent driving pattern and a multistage driving control of intermittently driving the receiving unit with a multistage intermittent driving pattern in which a driving period in the first intermittent driving pattern is set to a second intermittent driving pattern of which an intermittent cycle is shorter than that of the first intermittent driving pattern.

As another aspect, the invention may be configured as an electronic apparatus comprising the receiving device described above.

According to the first aspect and the like of the invention, the driving of the receiving unit (which receives a satellite signal from a positioning satellite) is controlled using the first driving control of intermittently driving the receiving unit with a first intermittent driving pattern having a driving period, and a multistage driving control of intermittently driving the receiving unit with a multistage intermittent driving pattern with a second intermittent driving pattern in which an intermittent cycle is shorter than that of the driving period of the first intermittent driving pattern. By performing two types of driving controls (e.g., the first driving control and the multistage driving control), it is possible to reduce power consumption in the receiving unit, and thus realize more power saving in the receiving device as a whole.

A second aspect of the invention is directed to the receiving unit driving control method according to the first aspect, which further includes a switching control of switching between the first driving control and the multistage driving control.

A third aspect of the invention is directed to the receiving unit driving control method according to the second aspect, which further includes a second driving control of intermittently driving the receiving unit with the second intermittent driving pattern, wherein the switching control includes switching the driving control to any one of the first driving control, the multistage driving control, and the second driving control.

According to the second or third aspect, it is possible to switch the control mode to various driving controls depending on the particular purpose, and thus more effectively reduce power saving.

A fourth aspect of the invention is directed to the receiving unit driving control method according to the second or third aspect, wherein the driving control is switched based on a receiving condition including at least a receiving signal intensity of the satellite signal.

According to the fourth aspect, by switching the driving control depending on the receiving condition including at least the received signal intensity of the satellite signal, it is possible to select an appropriate driving control depending on the receiving condition of a satellite signal and to control the driving of the receiving unit.

A fifth aspect of the invention is directed to the receiving unit driving control method according to any one of the second to fourth aspects, which further includes calculating a position based on the satellite signal received by the receiving unit, wherein the driving control is switched based on whether it is before or after performing the position calculating operation.

Before performing a position calculating operation, since satellite orbit data needs to be decoded from the received signal, there is a demand for activating the receiving unit as much as possible. However, for a short time just after performing the position calculating operation, since the position can be calculated without decoding the satellite orbit data, the receiving unit may be deactivated. Therefore, like the fifth aspect, by switching the driving control depending on whether it is before or after performing the position calculating operation, it is possible to more flexibly control the driving of the receiving unit.

A sixth aspect of the invention is directed to the receiving unit driving control method according to any one of the first to fifth aspects, which further includes controlling a duty ratio of the second intermittent driving pattern.

According to the sixth aspect, by controlling the duty ratio of the second intermittent driving pattern, it is possible to intermittently drive the receiving unit while changing the intermittent cycle.

A seventh aspect of the invention is directed to the receiving unit driving control method according to any one of the first to sixth aspects, wherein the driving period of the first intermittent driving pattern is equal to or more than 20 ms, and the driving period of the second intermittent driving pattern is equal to or greater than 1 ms, and less than 20 ms.

BRIEF DESCRIPTION OF THE DRAWINGS

The invention will be described with reference to the accompanying drawings, wherein like numbers reference like elements.

FIG. 3 is a diagram illustrating a third power saving mode.

FIG. 4 is a diagram illustrating an example of a table configuration of an operating mode switching control table.

FIG. 5 is a diagram illustrating a first duty ratio.

FIG. 11 is a diagram illustrating a method of setting a second duty ratio.

FIG. 12 is a diagram illustrating a method of setting first and second duty ratios.

DESCRIPTION OF EXEMPLARY EMBODIMENTS

Figure 1:
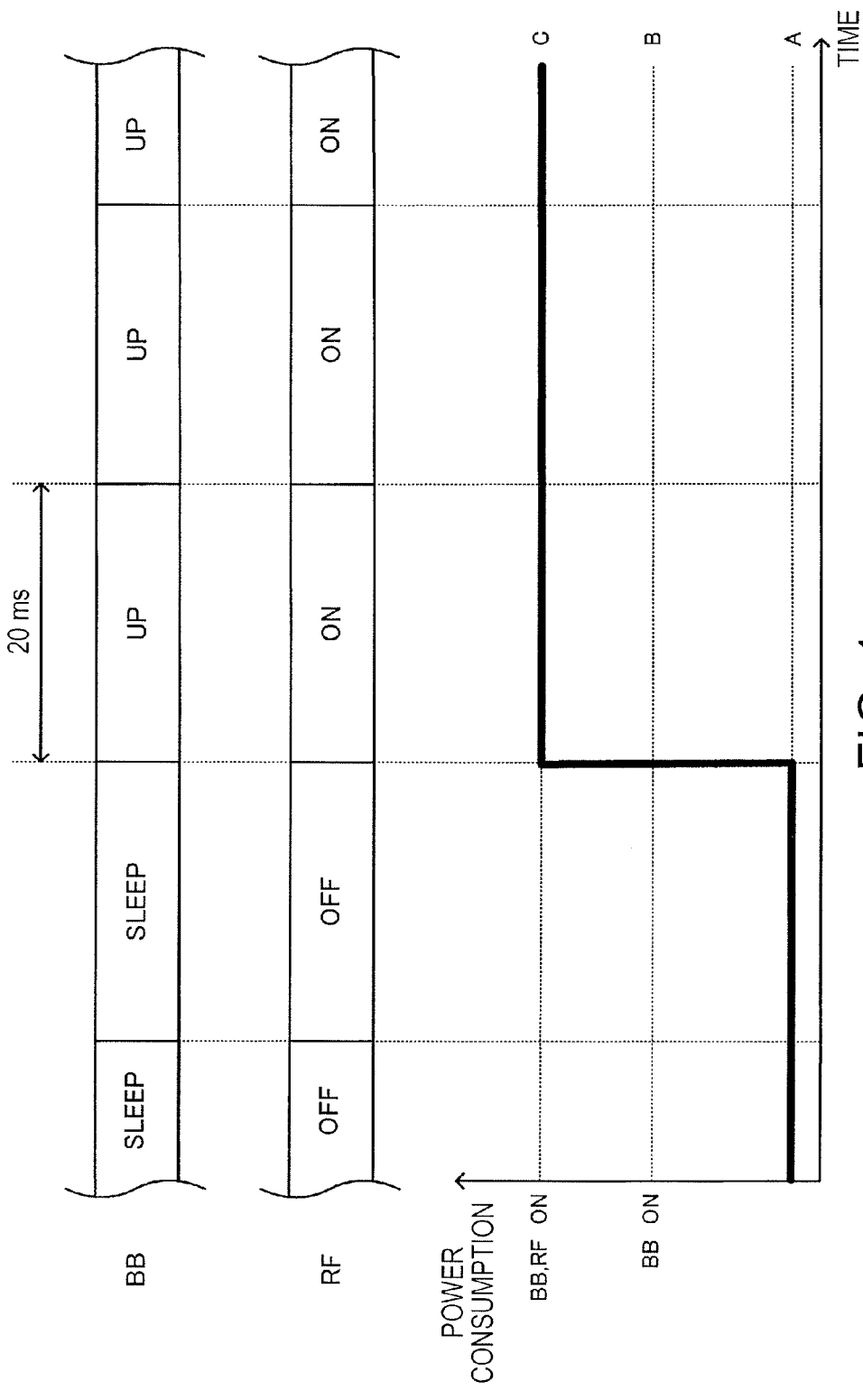
FIG. 1 is a diagram illustrating a first power saving mode.

Hereinafter, an exemplary embodiment of the invention will be described with reference to the accompanying drawings. In this exemplary embodiment, the invention is applied to a global positioning system (GPS) which is a kind of satellite positioning system. The invention is not limited to the below-described exemplary embodiment.

1. Principle

In this exemplary embodiment, a GPS receiver receives a GPS satellite signal emitted from a GPS satellite, which is a kind of positioning satellite, and performs a position calculating operation. The GPS receiver includes an RF receiving circuit unit as a receiving unit that receives the GPS satellite signal and a baseband processing circuit unit that processes the GPS satellite signal received by the RF receiving circuit unit and calculates a position.

In this exemplary embodiment, the RF receiving circuit unit and the baseband processing circuit unit are controlled in any of four types of operating modes. The four types of operating modes include a normal mode and three types of power saving modes (a first power saving mode to a third power saving mode).

The normal mode is a mode in which the RF receiving circuit unit and the baseband processing circuit unit are normally driven. In the normal mode, power consumption is the largest in all the operating modes so as to fully activate the RF receiving circuit unit and the baseband processing circuit unit.

The power saving modes are modes in which power consumption is reduced by intermittently driving the RF receiving circuit unit and the baseband processing circuit unit. The power saving modes can be divided into three types of power saving modes depending on patterns (hereinafter, referred to as "intermittent driving patterns") for intermittently driving the RF receiving circuit unit and the baseband processing circuit unit.

The operation state of the baseband processing circuit unit includes an UP state and a SLEEP state. The baseband processing circuit unit is controlled to set each unit period to any one operation state of the UP state and the SLEEP state using a time interval (20 ms) of one bit length based on the bit rate of a navigation message as a unit period.

In the UP state, a capturing process, a position calculating process, and an operating mode switching control process are performed on the GPS satellite signal received by the RF receiving circuit unit.

In the SLEEP state, the capturing process and the position calculating process are not performed, and the operating mode switching control process is performed. In the SLEEP state, the operation clock may be lowered in comparison with the UP state.

Hereinafter, a unit period in the UP state is referred to as an "UP period" and a unit period in the SLEEP state is referred to as a "SLEEP period".

The operation state of the RF receiving circuit unit includes an ON state and an OFF state. The ON state is a state where the RF receiving circuit unit is supplied with power from a power supply. That is, in this state, the RF receiving circuit unit performs circuit operations such as amplifying an RF signal received by the GPS antenna, down-converting the RF signal into an intermediate frequency signal, cutting an unnecessary frequency band component, and converting the received signal which is an analog signal into a digital signal.

The OFF state is a state where the RF receiving circuit unit is not supplied with power from the power supply circuit unit. That is, in this state, the RF receiving circuit unit does not perform the circuit operations.

Hereinafter, a period in the ON state is referred to as an "ON period" and a period in the OFF state is referred to as an "OFF period".

1-1. Power Saving Modes (1) First Power Saving Mode

FIG. 1 is a diagram illustrating a first power saving mode. An example of a variation in operation state of the baseband processing circuit unit (BB (BaseBand)) is illustrated in the upper part and an example of a variation in operation state of the RF receiving circuit unit is illustrated in the middle part. A graph of the temporal variations in power consumption of the GPS receiver as a whole in the operation states of the upper part and the middle part is illustrated in the lower part. The same is true of FIGS. 2 and 3.

In the graph of the lower part, power A represents the lowest power which is the sum of the power consumption due to the circuit resistance of the GPS receiver as a whole and the power necessary for the baseband processing circuit unit to operate in the SLEEP state. Power B represents the maximum power consumption of the baseband processing circuit unit. Power C represents the maximum power consumption of the GPS receiver as a whole.

In the first power saving mode, the baseband processing circuit unit is controlled to repeat the UP period and the SLEEP period with a predetermined cycle. The RF receiving circuit unit is controlled to be intermittently driven in synchronization with the baseband processing circuit unit. That is, in the UP period in which the baseband processing circuit unit is in the UP state, the RF receiving circuit unit is in the ON state and the ON period progresses. In the SLEEP period in which the baseband processing circuit unit is in the SLEEP state, the RF receiving circuit unit is in the OFF state and the OFF period progresses.

Regarding the duty ratio of the intermittent driving of the baseband processing circuit unit, how many unit periods should be set to the UP period and how many unit periods should be set to the SLEEP period are set. On the other hand, since the RF receiving circuit unit is intermittently driven in synchronization with the baseband processing circuit unit, the duty ratio (ratio of the ON period and the OFF period) of the intermittent driving of the RF receiving circuit unit is equal to the duty ratio of the intermittent driving of the baseband processing circuit unit. Hereinafter, the duty ratio in the first power saving mode is referred to as a first duty ratio. The intermittent driving pattern in the first power saving mode is referred to as a first intermittent driving pattern and the driving control in the first power saving mode is referred to as a first driving control.

The first duty ratio will be described in more detail. The first duty ratio is defined as a ratio of the length of the UP period (or ON period) and the length of the SLEEP period (or the OFF period) in a cycle of the position calculating operation. The cycle of the position calculating operation is set to "1000 ms (=1 s)" in this exemplary embodiment. In this exemplary embodiment, it is assumed that the first duty ratio is a fixed ratio (for example, 0.6:0.4). Therefore, paying attention to the RF receiving circuit unit, in the first driving control, a pattern (first intermittent driving pattern) in which 600 ms out of 1000 ms is the ON period and the other 400 ms is the OFF period is obtained as shown in FIG. 5.

In the first power saving mode, a navigation message cannot be decoded. When it is intended to decode a navigation message, data of 1,500 bits (=30 s) corresponding to 1 frame without any missing part is necessary. 1 bit corresponds to 20 ms which corresponds to a unit period. Since the RF receiving circuit unit is switched to ON/OFF states for each unit period, data is missed.

Referring to FIG. 1 again, the power consumption in the first power saving mode will be described. In the first power saving mode, the RF receiving circuit unit is in the ON state when the baseband processing circuit unit is in the UP state, and the RF receiving circuit unit is in the OFF state when the baseband processing circuit unit is in the SLEEP state. Accordingly, the power consumption of the GPS receiver is the maximum power consumption C in the UP period (ON period) and is the lowest power A in the SLEEP period (OFF period).

(2) Second Power Saving Mode

Figure 2:
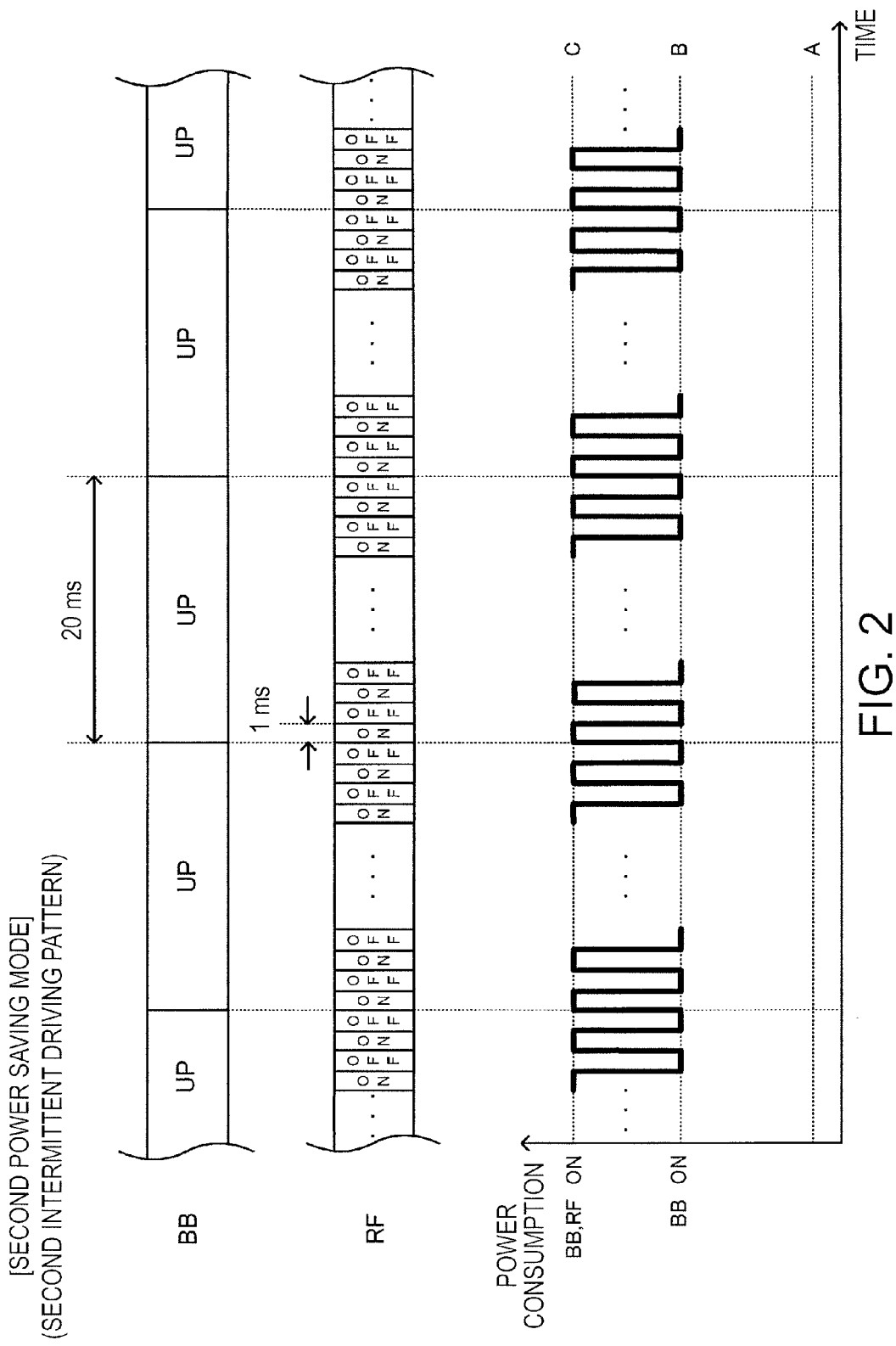
FIG. 2 is a diagram illustrating a second power saving mode.

FIG. 2 is a diagram illustrating the second power saving mode. In the second power saving mode, the baseband processing circuit unit is normally in the UP state. On the other hand, the RF receiving circuit unit is intermittently driven to switch the ON/OFF states every 1 ms. The time of "1 ms" corresponds to a carrier time (reception time) of a code length of a coarse/acquisition (C/A) code which is a spread code of a GPS satellite signal. The C/A code is a pseudo-random noise code with a cycling period of 1 ms having a code length of 1023 chips as 1 PN frame and is a code unique to each GPS satellite.

In the second power saving mode, the intermittent cycle of the RF receiving circuit unit is 2 ms. Therefore, in the second power saving mode, the intermittent cycle of the RF receiving circuit unit is shorter than that in the first power saving mode. Therefore, in the second power saving mode, the RF receiving circuit unit is intermittently driven with a driving pattern of which the intermittent cycle is shorter than that of the first intermittent driving pattern. The intermittent driving pattern in the second power saving mode is referred to as a second intermittent driving pattern and the intermittent driving control with the second intermittent driving pattern is referred to as a second driving control.

In the second driving control, since the RF receiving circuit unit is controlled to alternate the ON state and the OFF state every 1 ms, the ratio (duty ratio) of the ON period and the OFF period is "0.5:0.5". The duty ratio of the second intermittent driving pattern is referred to as a second duty ratio.

In the second intermittent driving pattern, one unit period includes 10 intermittent cycles of the RF receiving circuit unit, but the intermittent cycle may be set to be longer. Here, one unit period has only to include two or more intermittent cycles.

In the second power saving mode, the baseband processing circuit unit is normally in the UP state (that is, normally in the UP period), and the RF receiving circuit unit is intermittently driven to alternate the ON state and the OFF state every 1 ms. Accordingly, the power consumption has a pattern in which the maximum power consumption B of the baseband processing circuit unit and the maximum power consumption C of the GPS receiver are repeated every 1 ms. Therefore, in the second power saving mode, the power consumption of the RF receiving circuit unit is substantially a half in the normal mode.

In the second power saving mode, a navigation message can be decoded, unlike the first power saving mode. 1,500 bits (=30 s) of a navigation message corresponding to 1 frame is not continuously received, but since the RF receiving circuit unit is in the ON state for 10 ms which is a half of the period of 20 ms (=unit period) being a reception time of 1 bit, data of the corresponding bits can still be received, and data is not missed. Data error (bit error) may occur due to a problem with receiving sensitivity.

(3) Third Power Saving Mode

FIG. 3 is a diagram illustrating a third power saving mode. The third power saving mode is a power saving mode in which the first power saving mode and the second power saving mode are combined. Specifically, in the SLEEP period in which the baseband processing circuit unit is in the SLEEP state, the RF receiving circuit unit is in the OFF state. On the other hand, in the UP period in which the baseband processing circuit unit is in the UP state, the RF receiving circuit unit is intermittently driven to alternate the ON period and the OFF period every 1 ms.

This corresponds to intermittent driving of the RF receiving circuit unit with an intermittent driving pattern in which the driving period (ON period) in the first intermittent driving pattern is set to the second intermittent driving pattern of which the intermittent cycle is shorter than that of the first intermittent driving pattern. The intermittent driving pattern in the third power saving mode is referred to as a multistage intermittent driving pattern, and the intermittent driving control with the multistage intermittent driving pattern is referred to as a multistage driving control.

In the third power saving mode, since the RF receiving circuit unit is in the OFF state in the SLEEP period in which the baseband processing circuit unit is in the SLEEP state, the total power consumption of the GPS receiver is the lowest power A. On the other hand, in the UP period in which the baseband processing circuit unit is in the UP state, the RF receiving circuit unit is intermittently driven to alternate the ON state and the OFF state. Therefore, the power consumption in the meantime has a pattern in which the maximum power consumption B of the baseband processing circuit unit and the maximum power consumption C of the GPS receiver are alternated every 1 ms. The third power saving mode is a mode having the lowest power consumption in all the operating modes.

In the third power saving mode, a navigation message cannot be decoded, like the first power saving mode.

1-2. Method of Setting Operating Mode

FIG. 4 is a diagram illustrating a method of setting an operating mode in this exemplary embodiment. In FIG. 4, an example of an operating mode switching control table used to control switching of an operating mode is illustrated. In the operating mode switching control table, absence or presence of an ephemeris, a FIX state, a received signal intensity, and an operating mode are correlated with each other.

The presence or absence of an ephemeris represents whether an ephemeris which is a kind of satellite orbit data is present.

The FIX state indicates whether it is before or after the baseband processing circuit unit performs a position calculating operation.

The received signal intensity is the intensity of a signal received by the RF receiving circuit unit and defines a threshold condition for the received signal intensity. The received signal intensity is an example of a receiving condition of a GPS satellite signal.

(A) Absence of Ephemeris (A-1) Before FIX

In a state where an ephemeris is not present and it is before FIX, the operating mode is switched to the "normal mode" and the "second power saving mode". Specifically, the operating mode is switched to the "normal mode" when the received signal intensity satisfies a condition of "P≤θ10", and the operating mode is switched to the "second power saving mode" when the received signal intensity satisfies a condition of "θ10<P". Here, "θ10" is an example of a threshold value of the received signal intensity.

An ephemeris is necessary for calculating a position. Accordingly, when an ephemeris is not present, it is necessary to acquire an ephemeris by decoding the received signal. This situation is a situation of so-called cold start or warm start. As the received signal intensity becomes smaller, the possibility of occurrence of a decoding error when decoding the received signal becomes larger. Therefore, when the received signal intensity is equal to or lower than a predetermined threshold value, the operating mode is switched to the normal mode so as to surely acquire the ephemeris.

On the other hand, when the received signal intensity is large, the possibility of occurrence of a decoding error is lowered. Therefore, when the received signal intensity is greater than a predetermined threshold value, the operating mode is switched to the second power saving mode with a priority to reduction of the power consumption.

(A-2) After FIX

In a state where an ephemeris is not present and it is after FIX, the operating mode is switched to the "normal mode", the "first power saving mode", and the "third power saving mode". Specifically, when the received signal intensity satisfies a condition of "P≤θ20", the operating mode is set to the "normal mode". The operating mode is switched to the "first power saving mode" when the received signal intensity satisfies a condition of "θ20<P<θ30", and the operating mode is switched to the "third power saving mode" when the received signal intensity satisfies of "θ30≤P". Here, "θ20" and "θ30" are examples of a threshold value of the received signal intensity.

As described above, in the first and third power saving mode, a navigation message cannot be decoded. However, since the navigation message has been decoded before FIX (before calculating a position), the navigation message does not need to be decoded after FIX (after calculating a position). Accordingly, a process of tracking a GPS satellite which has been successfully captured has only to be performed.

Therefore, in a situation in which the received signal intensity is determined to be relatively large, the first power saving mode and the third power saving mode are switched to realize power saving. This corresponds to the switching control of switching the driving control to the first driving control and the multistage driving control. Here, in a situation in which the received signal intensity is small, since the tracking lock of the captured GPS satellite may be released, GPS satellites are tracked in the normal mode without using the power saving mode.

(B) Presence of Ephemeris (B-1) Before FIX

In a state where an ephemeris is present and it is before FIX, the operating mode is uniformly set to the normal mode without depending on the received signal intensity. This is intended to shorten a so-called time to first fix (TTFF).

When an ephemeris is present, the position calculating operation can be started without waiting for decoding an ephemeris. This situation is a situation of so-called hot start. In this situation, the position calculating operation can be started immediately. Accordingly, when the GPS receiver operates with maximum performance, the position calculating operation can be completed substantially for a short time less than 1 second. Therefore, the position calculation is assumed to be performed considering the operation mode as the normal mode.

(B-2) After FIX

In a state where an ephemeris is present and it is after FIX, the operating mode is switched to the normal mode, the first power saving mode and the third power saving mode. The idea in this case is the same as described in (A-2) After FIX.

In this way, according to this exemplary embodiment, the RF receiving circuit unit which is a receiving unit of a GPS satellite signal is intermittently driven while switching the operating mode (driving control) depending on plural switching criteria such as the presence or absence of an ephemeris, before or after performing a position calculating operation, and a received signal intensity. This corresponds to switching the driving control to one of the first driving control, the multistage driving control, and the second driving control.

For example, in this exemplary embodiment, the switching destination of the operating mode is determined depending on the FIX state. This corresponds to determining the switching destination of the driving control depending on whether it is before or after performing a position calculating operation. In this exemplary embodiment, the switching destination is determined depending on the received signal intensity of a GPS satellite signal. This corresponds to determining the switching destination of the driving control depending on the receiving condition including at least the received signal intensity of a GPS satellite signal.

2. Example

An example of a receiving device that receives a GPS satellite signal will be described below. In this example, a mobile phone will be described as an electronic apparatus having a receiving device.

2-1. Configuration of Mobile Phone

Figure 6:
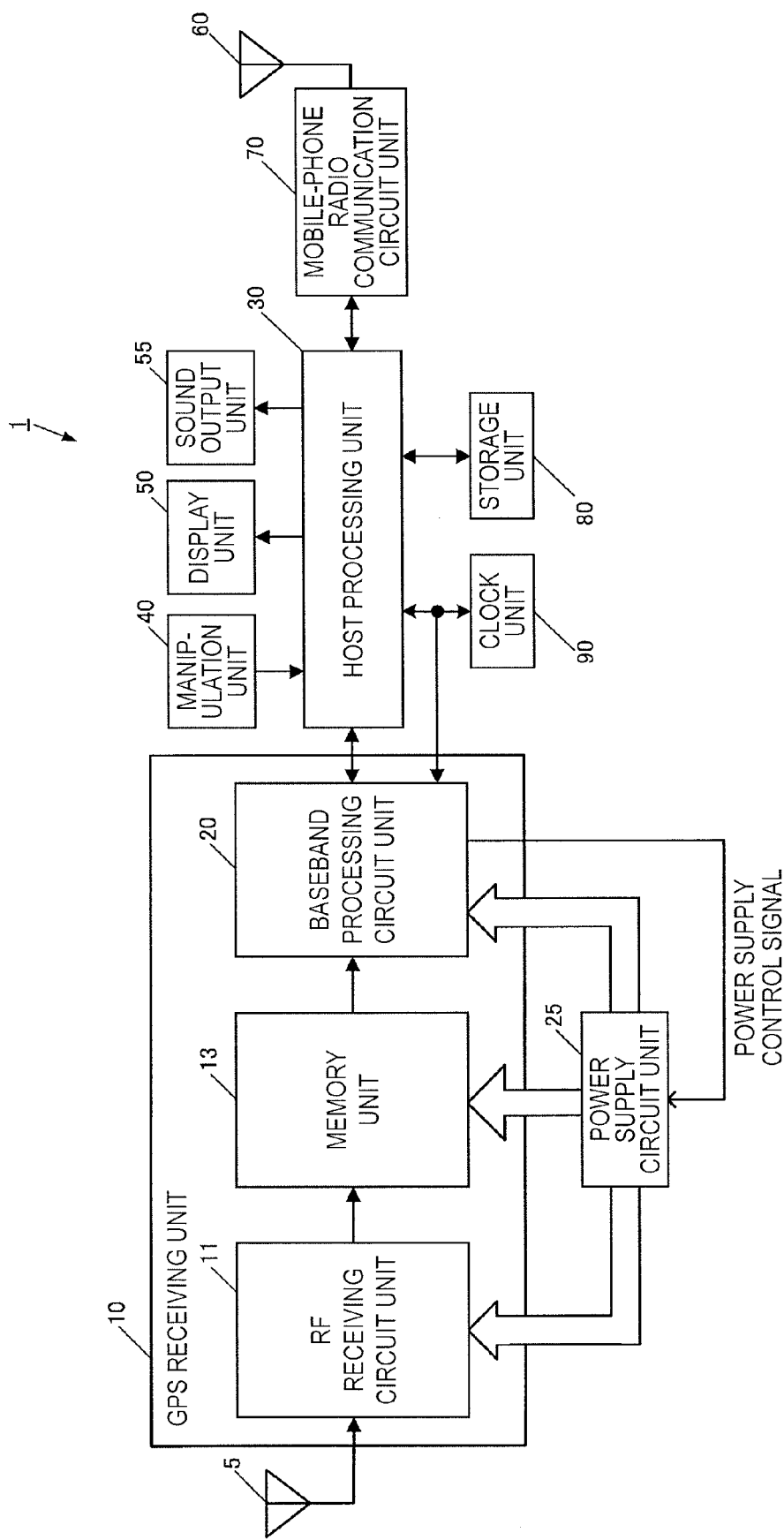
FIG. 6 is a block diagram illustrating an example of a functional configuration of a mobile phone.

FIG. 6 is a block diagram illustrating an example of a functional configuration of a mobile phone 1 according to this exemplary embodiment. The mobile phone 1 includes a GPS antenna 5, a GPS receiving unit 10, a power supply circuit unit 25, a host processing unit 30, a manipulation unit 40, a display unit 50, a sound output unit 55, a mobile-phone antenna 60, a mobile-phone Radio communication circuit unit 70, a storage unit 80, and a clock unit 90.

The GPS antenna 5 is an antenna that receives a radio frequency (RF) signal including a GPS satellite signal emitted from a GPS satellite, and outputs the received signal to the GPS receiving unit 10. The GPS satellite signal is a communication signal of 1.57542 [GHz] which is modulated by a code division multiple access (CDMA) system known as a spectrum spread system using a C/A code which is a kind of spread code.

The GPS receiving unit 10 is a circuit or a device that calculates the position of the mobile phone 1 on the basis of the signal output from the GPS antenna 5 and is a functional block corresponding to a so-called GPS receiver. In this exemplary embodiment, the GPS receiving unit 10 corresponds to the receiving device.

The GPS receiving unit 10 includes an RF receiving circuit unit 11, a memory unit 13, and a baseband processing circuit unit 20. The RF receiving circuit unit 11, the memory unit 13, and the baseband processing circuit unit 20 may be manufactured as individual large scale integration (LSI) chips or as a single chip.

The RF receiving circuit unit 11 is a receiving circuit of an RF signal and corresponds to the receiving unit that receives a GPS satellite signal carrying a navigation message. As the circuit configuration of the RF receiving circuit unit 11, for example, a receiving circuit that converts an RF signal output from the GPS antenna 5 into a digital signal by the use of an A/D converter and processes the digital signal may be configured. A receiving circuit may be configured to process the RF signal output from the GPS antenna 5 as an analog signal, to finally convert the processed signal in an A/D conversion manner, and to output the digital signal to the memory unit 13.

In the latter, for example, the RF receiving circuit unit 11 may be configured as follows. That is, an RF signal-multiplication oscillation signal is generated by dividing or multiplying a predetermined oscillation signal. By multiplying the generated oscillation signal by the RF signal output from the GPS antenna 5, the RF signal is down-converted into a signal of an intermediate frequency (hereinafter, referred to as an "IF signal"). Then, the IF signal is amplified and then is converted into a digital signal by the use of an A/D converter, and the digital signal is output to the memory unit 13.

The memory unit 13 is a storage unit that stores data of the received signal down-converted by the RF receiving circuit unit. When the driving of the RF receiving circuit unit 11 is controlled in the normal mode, data of the received signal continuously output from the RF receiving circuit unit 11 is cumulatively written thereto. When the RF receiving circuit unit 11 is controlled to be intermittently driven, data of the received signal intermittently output from the RF receiving circuit unit 11 is cumulatively written thereto. The memory unit 13 can be configured, for example, as a ring buffer having memory capacity enough to store data of the received signal corresponding to three or more unit periods. The storage capacity may be larger.

The baseband processing circuit unit 20 performs operations of capturing and tracking a GPS satellite signal, such as removing a carrier or performing a correlation operation, using data of the received signal stored in the memory unit 13 to capture and track a GPS satellite signal. The baseband processing circuit unit 20 calculates the position or the clock error of the mobile phone 1 using time data or satellite orbit data extracted from the GPS satellite signal.

The power supply circuit unit 25 includes a power supply circuit that supplies power to the GPS receiving unit 10. The power supply circuit unit 25 supplies power to the functional units (the RF receiving circuit unit 11, the memory unit 13, and the baseband processing circuit unit 20) of the GPS receiving unit 10 in response to a power supply control signal output from the baseband processing circuit unit 20. The intermittent driving of the RF receiving circuit unit 11 which is one feature of this exemplary embodiment is embodied through the power supply control by the baseband processing circuit unit 20.

The host processing unit 30 is a processor that comprehensively controls the units of the mobile phone 1 in accordance with various programs such as a system program stored in the storage unit 80, and includes a processor such as a central processing unit (CPU). The host processing unit 30 displays a map on which a current position is marked on the display unit 50 or uses the position coordinate thereof for various application processes on the basis of the position coordinate acquired from the baseband processing circuit unit 20.

The manipulation unit 40 is an input device including, for example, a touch panel or button switches, and outputs a signal of a pressed key or button to the host processing unit 30. By manipulation of the manipulation unit 40, various instructions such as a call request, a request for e-mail transmission and reception, requests for executing various applications, and a request for position calculation are input.

The display unit 50 is a display device including a liquid crystal display (LCD) or the like and displays a variety of information based on a display signal output from the host processing unit 30. A position display picture, time information, or the like is displayed on the display unit 50.

The sound output unit 55 is a sound output device including a speaker or the like and outputs various sounds based on a sound output signal output from the host processing unit 30. A sound in call, audio guidance relevant to various applications, and the like are output from the sound output unit 55.

The mobile-phone antenna 60 is an antenna used to transmit and receive a mobile-phone radio signal to and from a wireless base station installed by the communication service provider of the mobile phone 1.

The mobile-phone radio communication circuit unit 70 is a communication circuit unit of a mobile phone including an RF conversion circuit and a baseband processing circuit and realizes calls or transmission and reception of e-mails by modulating and demodulating the mobile-phone radio signal.

The storage unit 80 includes a storage device such as a ROM (Read Only Memory), a flash ROM, and a RAM (Random Access Memory) and stores a system program allowing the host processing unit 30 to control the mobile phone 1, various programs for performing various application processes, or data.

The clock unit 90 is an internal clock of the mobile phone 1 and includes a crystal oscillator including a quartz vibrator and an oscillation circuit. The clocked time of the clock unit 90 is frequently output to the baseband processing circuit unit 20 and the host processing unit 30. The clocked time of the clock unit 90 is corrected on the basis of the clock error calculated by the baseband processing circuit unit 20.

2-2. Configuration of Baseband Processing Circuit Unit

Figure 7:
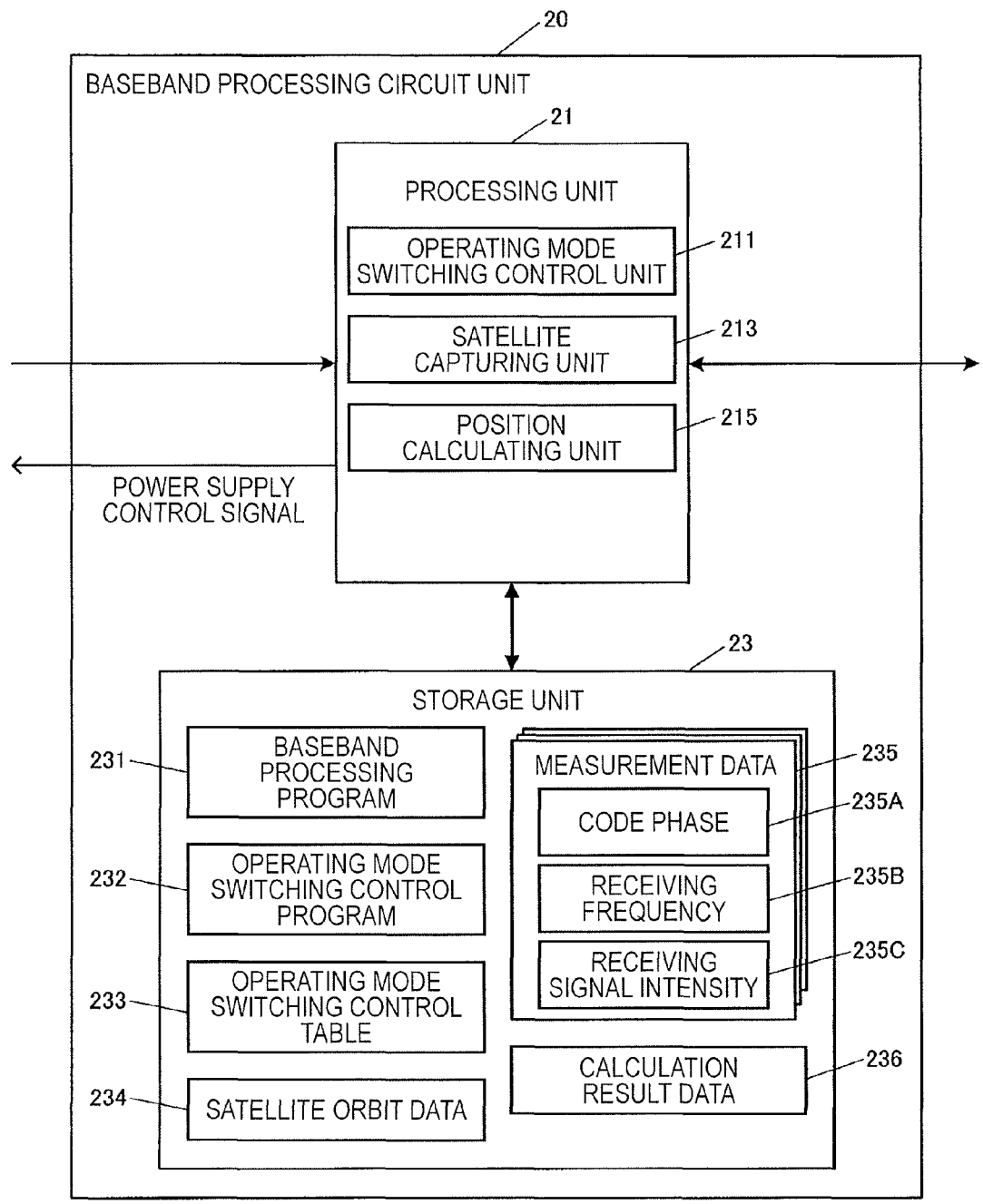
FIG. 7 is a diagram illustrating an example of a circuit configuration of a baseband processing circuit unit.

FIG. 7 is a diagram illustrating the circuit configuration of the baseband processing circuit unit 20 and is a diagram illustrating circuit blocks of this example. The baseband processing circuit unit 20 includes a processing unit 21 and a storage unit 23 as main functional units.

The processing unit 21 is an arithmetic and control unit that collectively controls the functional units of the baseband processing circuit unit 20 and includes a processor such as a CPU or a DSP (Digital Signal Processor).

The processing unit 21 includes an operating mode switching control unit 211, a satellite capturing unit 213, and a position calculating unit 215 as main functional units. These functional units are only examples and all of these functional units are not essential elements. Other functional units may be used as essential elements.

The operating mode switching control unit 211 controls switching of the operating mode of the RF receiving circuit unit 11 and the baseband processing circuit unit 20 in accordance with the above-mentioned principles. The operating mode switching control unit 211 corresponds to the control unit that controls the driving of the receiving unit by switching the driving control to the first driving control and the multistage driving control. The operating mode switching control unit 211 intermittently drives the RF receiving circuit unit 11 by outputting a power supply control signal based on the intermittent driving pattern to the power supply circuit unit 25 and controlling the power supply so as to realize the driving control based on the set operating mode.

The satellite capturing unit 213 captures a GPS satellite (GPS satellite signal). Specifically, the satellite capturing unit 213 performs a digital signal process such as removing a carrier or performing a correlation operation on data of the digitalized received signal stored in the memory unit 13 and captures a GPS satellite on the basis of the result of the digital signal process.

The position calculating unit 215 calculates the position (position coordinate) and the clock error (clock bias) of the mobile phone 1 by performing a position calculating operation, to which known techniques are applied, using satellite orbit data 234 or measurement data 235 acquired for each capturing target satellite. The position calculating process can be realized as a process employing a technique such as a least square method or a Kalman filter.

The storage unit 23 stores a system program of the baseband processing circuit unit 20, various programs for performing various functions such as a driving control function, a satellite capturing function, and a position calculating function, data, and the like. The storage unit 23 has a work area for temporarily storing data in process, process result, and the like of various processes.

The storage unit 23 stores a baseband processing program 231 which is read and executed as a baseband process (see FIG. 8) by the processing unit 21 and an operating mode switching control program 232 which is executed as an operating mode switching control process (see FIG. 9) as a program. These processes will be described in detail later with reference to flowcharts.

The storage unit 23 stores an operating mode switching control table 233, satellite orbit data 234, measurement data 235, and calculation result data 236 as significant data.

The operating mode switching control table 233 is a table used for the operating mode switching control unit 211 to control the switching of the operating mode. A table configuration example of the operating mode switching control table 233 is shown in FIG. 4.

The satellite orbit data 234 is data such as an almanac or an ephemeris of each GPS satellite. The satellite orbit data 234 is acquired by decoding GPS satellite signals received from the GPS satellites, and is also acquired as assist data, for example, from a base station of the mobile phone 1 or an assistant server.

The measurement data 235 includes various quantities relevant to the captured GPS satellite, such as a code phase 235A, a receiving frequency 235B, and a received signal intensity 235C.

The calculation result data 236 is data of the calculation result acquired by causing the position calculating unit 215 to perform a position calculating process, and includes the calculated position or clock error of the mobile phone 1.

2-3. Flow of Processes

Figure 8:
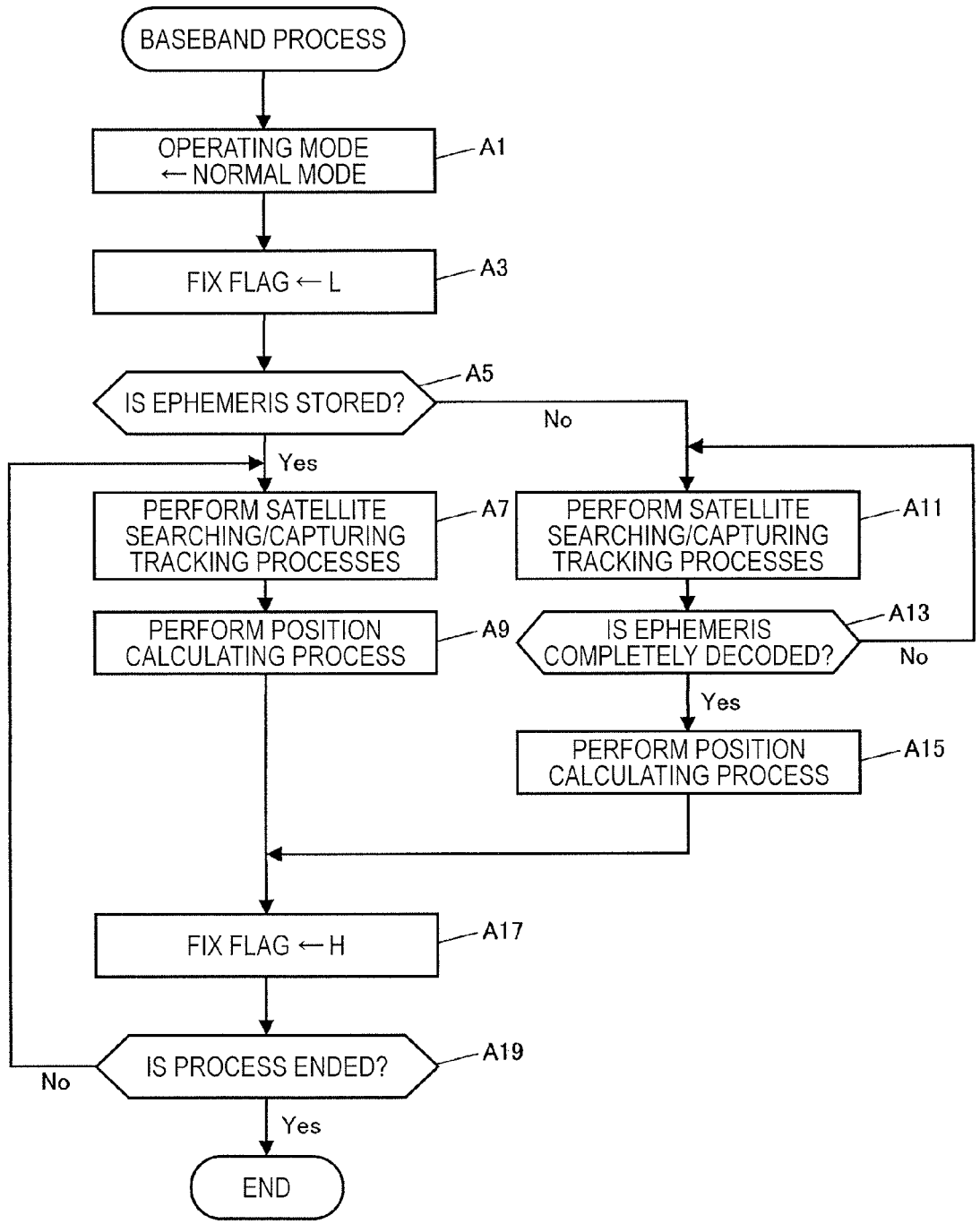
FIG. 8 is a flowchart illustrating a flow of a baseband process.

FIG. 8 is a flowchart illustrating a flow of a baseband process performed by the processing unit 21 in accordance with the baseband processing program 231 stored in the storage unit 23.

First, the processing unit 21 sets the normal mode as an operating mode (step A1). The processing unit 21 sets an FIX flag to L (step A3). The FIX flag is a flag in which a value representing whether it is before or after performing a position calculating operation is set, and is set to L before performing the position calculating operation, and is set to H after performing the position calculating operation.

Subsequently, the processing unit 21 determines whether an ephemeris is stored in the storage unit 23 (step A5). When it is determined that an ephemeris is stored in the storage unit (YES in step A5), the satellite capturing unit 213 performs a satellite searching process and a GPS satellite capturing and tracking process (step A7). This situation is a situation of so-called hot start.

Specifically, a capturing target satellite is selected using the ephemeris. That is, a GPS satellite located in the sky of the mobile phone 1 at the current date and time clocked by the clock unit 90 is determined and selected as a capturing target satellite using the ephemeris. A correlation operation using a replica code is performed on each capturing target satellite to capture and track a GPS satellite signal.

Then, the position calculating unit 215 performs the position calculating process of calculating the position and the clock error of the mobile phone 1 and stores the calculation result as the calculation result data 236 in the storage unit 23 (step A9).

When it is determined in step A5 that an ephemeris is not stored (NO in step A5), the satellite capturing unit 213 performs a satellite searching process and a satellite capturing and tracking process (step A11). This situation is a situation of so-called cold start or warm start.

In the cold start, since any ephemeris and any almanac are not present, a satellite located in the sky of the mobile phone 1 cannot be determined. Accordingly, for example, a satellite searching process is performed sequentially from the first satellite (SV1). On the contrary, in the warm start, since an ephemeris is not present but an almanac is present, capturing target satellites are selected using the almanac. Then, a satellite searching process is performed on the selected capturing target satellites.

Subsequently, the processing unit 21 waits until decoding of an ephemeris is completed (NO in step A13). When the decoding of an ephemeris is completed (YES in step A13), the position calculating unit 215 performs a position calculating process (step A15).

After step A9 or A15, the processing unit 21 sets the FIX flag to H (step A17). Then, the processing unit 21 determines whether the flow of processes should be ended (step A19), and performs the process of step A7 again when it is determined that the flow of processes should not be ended (NO in step A19). When it is determined that the flow of processes should be ended (YES in step A19), the baseband process is ended.

Figures 9, 10:
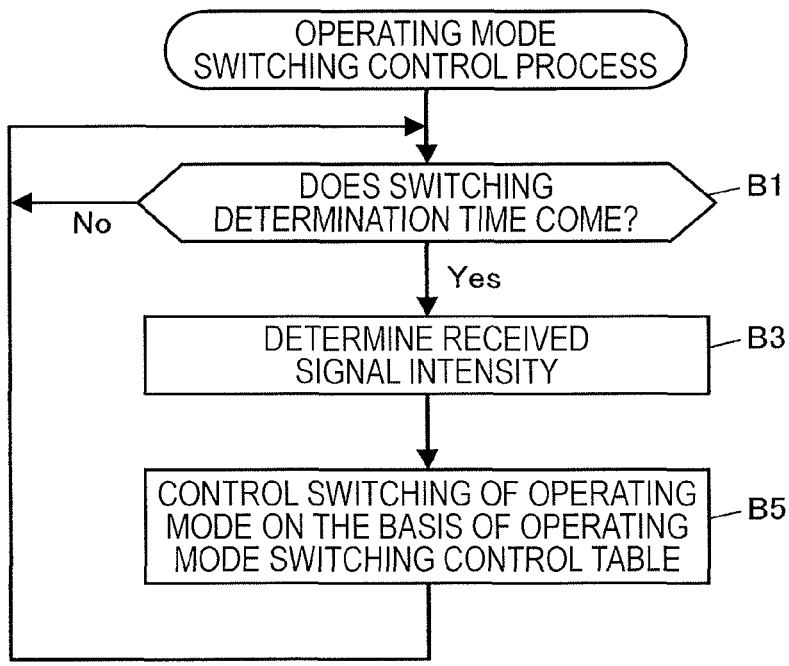
FIG. 9 is a flowchart illustrating a flow of an operating mode switching control process.
FIG. 10 is a diagram illustrating a method of setting a first duty ratio.

FIG. 9 is a flowchart illustrating a flow of an operating mode switching control process performed by the operating mode switching control unit 211 in accordance with the operation mode switching control program 232 stored in the storage unit 23.

The operating mode switching control unit 211 determines whether a switching determination time of the operating mode comes in (step B1). The switching determination time is an elapsed time every 20 ms. When it is determined that the switching determination time does not come in (NO in step B1), the operating mode switching control unit 211 waits.

When it is determined that the switching determination time comes in (YES in step B1), the operating mode switching control unit 211 determines the received signal intensity 235C acquired as the measurement data 235 (step B3). The operating mode switching control unit 211 performs a driving control of switching the operating mode on the basis of the operating mode switching control table 233 stored in the storage unit 23 (step B5) and then performs the process of B1 again.

3. Operational Advantages

In this exemplary embodiment, since plural types of driving controls are present, it is possible to adaptively switch the driving control and thus to further reduce the power consumption. Specifically, when an ephemeris is not present and it is before performing a position calculating operation, the driving control based on the normal mode and the second driving control based on the second power saving mode are switched on the basis of the received signal intensity. When an ephemeris is not present and it is after performing a position calculating operation, the driving control based on the normal mode, the first driving control based on the first power saving mode, and the multistage driving control based on the third power saving mode are switched on the basis of the received signal intensity.

Before performing a position calculating operation, since it is necessary to decode a navigation message from a GPS satellite, an intermittent driving is performed using the second driving control based on the second power saving mode in which the navigation message can be decoded. On the contrary, after performing a position calculating operation, since a position can be calculated without decoding the navigation message, the first driving control and the multistage driving control are switched as a more efficient power saving mode. In this way, by switching the driving control depending on scenes or conditions, it is possible to realize efficient power saving of a GPS receiver as a whole.

4. Modification Example

The invention is not limited to the above-mentioned examples and can be modified in various forms without departing from the concept of the invention. Modification examples of the invention will be described below.

4-1. Intermittent Cycle

Although it has been described in the above-mentioned exemplary embodiment that the intermittent cycle for intermittently driving the RF receiving circuit unit is set to 2 ms, this is only an example. Specifically, the intermittent cycle may be set to an intermittent cycle (for example, 4 ms or 10 ms) longer than 2 ms.

For example, when the intermittent cycle is set to 4 ms, the RF receiving circuit unit has only to be intermittently driven so as to switch the ON period and the OFF period every 2 ms, like the ON period of 2 ms→the OFF period of 2 ms→the ON period of 2 ms→ . . . .

Different times may be assigned to the ON period and the OFF period and the RF receiving circuit unit may be intermittently driven to alternately switch the ON period and the OFF period, for example, so that the ON period of 1 ms and the OFF period of 3 ms are alternately switched.

4-2. Determination of Switching Destination Depending on Receiving Condition

Although it has been stated in the above-mentioned exemplary embodiment that the switching destination of the driving control is determined on the basis of the received signal intensity of a GPS satellite signal, the determination criterion of the switching destination is not limited to the received signal intensity. The switching destination of the driving control may be determined, for example, on the basis of a reception environment of a GPS satellite signal instead of the received signal intensity of a GPS satellite signal.

For example, in the case of (A-1) before FIX described with reference to FIG. 4, the operating mode may be switched to the normal mode when the reception environment is a weak electric field environment, and the operating mode may be switched to the second power saving mode (the second driving control) when the reception environment is an intense electric field environment.

In the case of (A-2) after FIX described with reference to FIG. 4, the operating mode may be switched to the normal mode when the reception environment is a weak electric field environment, the operating mode may be switched to the first power saving mode (the first driving control) when the reception environment is an intermediate electric field environment, and the operating mode may be switched to the third power saving mode (the multistage driving control) when the reception environment is an intense electric field environment.

4-3 Setting Condition of Operating Mode

The method of setting the operating mode described with reference to FIG. 4 is only an example, and can be appropriately modified. For example, in the case of (A-1) before FIX, the operating mode may not employ the normal mode but the operating mode may be set uniformly to the second power saving mode.

In the case of (A-2) after FIX, the operating mode may not employ the normal mode but three types of power saving modes may be switched. Specifically, the threshold condition of the received signal intensity may be determined so that set the third power saving mode, the first power saving mode, and the second power saving mode in the order of decreasing the received signal intensity. The same is true of (B-2) after FIX.

4-4. Control of Duty Ratio (1) First Power Saving Mode

In the first power saving mode, the first duty ratio may not be set to a fixed ratio but may be set to be variable, and the first duty ratio may be controlled. In this case, for example, a method of controlling the first duty ratio on the basis of the received signal intensity can be employed.

FIG. 10 is a diagram illustrating a method of controlling the first duty ratio and shows a table used to set the first duty ratio. In this table, the operating mode, the received signal intensity, and the first duty ratio (UP period (ON period): SLEEP period (OFF period)) are correlated with each other.

The first power saving mode is set as the operating mode. The threshold condition of the received signal intensity is set as the receiving signal intensity. The table shown in FIG. 10 is prepared on the premise of the table shown in FIG. 4. From FIG. 4, it can be seen that the first power saving mode is applied when the received signal intensity satisfies the condition of "θ20<P<θ30". Accordingly, the threshold condition of the received signal intensity is determined on the premise that the received signal intensity satisfies the condition of "θ20<P<θ30".

When the received signal intensity satisfies the condition of "θ20<P<θ21", the first duty ratio is determined to be set to "0.9:0.1". Since "1,000 ms" which is the operation cycle of the baseband processing circuit unit is divided at the ratio of "0.9:0.1", the UP period progresses for "900 ms" and the SLEEP period progresses for "100 ms".

When the received signal intensity satisfies the condition of "θ21≤P<θ22", the first duty ratio is determined to be set to "0.8:0.2" (800 ms:200 ms). In the same way, when the received signal intensity satisfies the condition of "θ28≤P<θ30", the first duty ratio is determined to be set to "0.1:0.9" (100 ms:900 ms). That is, as the received signal intensity becomes larger, the ratio is determined so that the ratio of the UP period gradually becomes lower.

(2) Second Power Saving Mode

Similarly, in the second power saving mode, the second duty ratio may not be set to a fixed ratio but may be set to be variable, and the second duty ratio may be controlled. In this case, for example, a method of controlling the second duty ratio on the basis of the received signal intensity can be employed.

FIG. 11 is a diagram illustrating a method of controlling the second duty ratio and shows a table used to set the second duty ratio. In this table, similarly to the table shown in FIG. 10, the operating mode, the received signal intensity, and the second duty ratio are correlated with each other.

The second power saving mode is set as the operating mode. The threshold condition of the received signal intensity is set as the receiving signal intensity. The table shown in FIG. 11 is prepared on the premise of the table shown in FIG. 4. From FIG. 4, it can be seen that the second power saving mode is applied when the received signal intensity satisfies the condition of "θ10<P". Accordingly, the threshold condition of the received signal intensity is determined on the premise that the received signal intensity satisfies the condition of "θ10<P".

When the received signal intensity satisfies the condition of "θ10<P<θ12", the second duty ratio is determined to be set to "0.8:0.2". Since "20 ms" which is the unit period is divided at the ratio of "0.8:0.2", the ON period progresses for "16 ms" and the OFF period processes for "4 ms".

The second duty ratio is determined to be set to "0.6:0.4" (12 ms:8 ms) when the received signal intensity satisfies the condition of "θ12≤P<θ14", and the second duty ratio is determined to be set to "0.4:0.6" (8 ms:12 ms) when the received signal intensity satisfies the condition of "θ14≤P<θ16". When the received signal intensity satisfies the condition of "θ16≤P", the second duty ratio is determined to be set to "0.2:0.8" (4 ms:16 ms). This is the same as the method of setting the first duty ratio shown in FIG. 10, in that as the received signal intensity becomes larger, the ratio is determined so that the ratio of the ON period gradually becomes lower.

(3) Third Power Saving Mode

The third power saving mode is a power saving mode in which the first power saving mode and the second power saving mode are combined. Accordingly, the driving control using together the control of the first duty ratio and the control of the second duty ratio can be realized.

FIG. 12 is a diagram illustrating a method of controlling the first and second duty ratios in this case and shows a table used to set the first and second duty ratios. In this table, the operating mode, the received signal intensity, the first duty ratio, and the second duty ration are correlated with each other. This table illustrates the method of setting the first duty ratio and the second duty ratio with attention to the cases of (A-2) after FIX and (B-2) after FIX described with reference to FIG. 4.

From FIG. 4, it can be seen that when the received signal intensity satisfies the condition of "θ20<P<θ30", the operating mode is switched to the first power saving mode. In the first power saving mode, since only the first duty ratio can be set, the field of the second duty ratio is described as "-(NONE)". When the received signal intensity satisfies the condition of "θ30≤P", the operating mode is switched to the third power saving mode. In the third power saving mode, since the first duty ratio and the second duty ratio can be set, both are determined.

For the first duty ratio, the threshold condition of the received signal intensity is determined by considering the first power saving mode and the third power saving mode as a lump of mode. That is, as the received signal intensity becomes larger, the ratio is determined so that the ratio of the ON period gradually becomes lower over the range of the received signal intensity in which the first power saving mode is applied and the range of the received signal intensity in which the third power saving mode is applied.

For the second duty ratio, as the received signal intensity becomes lager, the ratio is determined so that the ratio of the ON period gradually becomes lower over the range of the received signal intensity in which the third power saving mode is applied.

Although it has been exemplified above that the duty ratios (the first duty ratio and the second duty ratio) are controlled on the basis of the received signal intensity, the duty ratios may be controlled on the basis of the reception environment instead of the received signal intensity. That is, the duty ratios may be controlled on the basis of the receiving condition including at least the received signal intensity of a satellite signal.

4-5. Processing Subject

Although it has been stated in the above-mentioned examplary embodiment that the driving control of the RF receiving circuit unit is performed by the processing unit of the baseband processing circuit unit, the driving control may be performed by a host processing unit of an electronic apparatus.

4-6. Electronic Apparatus

Although it has been stated in the above-mentioned exemplary embodiment that the invention is applied to the mobile phone which is a kind of electronic apparatus, the invention is not limited to the mobile phone. For example, the invention may be similarly applied to electronic apparatuses such as a car navigation apparatus, a portable navigation apparatus, a PC, a PDA (Personal Digital Assistant), and a wristwatch.

4-7. Satellite Positioning System

Although the GPS has been exemplified as the satellite positioning system in the above-mentioned exemplary embodiment, other satellite positioning systems such as WAAS (Wide Area Augmentation System), QZSS (Quasi Zenith Satellite System), GLONASS (GLObal NAvigation Satellite System), and GALILEO may be used.

What is claimed is:

1. A receiving unit driving control method comprising:
    operating the receiving unit in a first driving control mode of intermittently driving the receiving unit, which receives a satellite signal from a positioning satellite, in accordance with a first intermittent driving pattern having a first driving period of a predetermined unit time, wherein in the first driving control mode, a RF receiving circuit and a baseband processing circuit of the receiving unit are turned on and off together at the same time according to the first intermittent driving pattern, and the RF receiving circuit remains turned on while the baseband processing circuit is turned on; and
    operating the receiving unit in a multistage driving control mode of intermittently driving the receiving unit with a multistage intermittent driving pattern, wherein in the multistage driving control mode, the baseband processing circuit is turned on and off in accordance with the first intermittent driving pattern, and while the baseband processing circuit is turned on for at least the predetermined unit time, the RF receiving circuit is turned on and off according to a second intermittent driving pattern having a second driving period that is shorter than the predetermined unit time of the first driving period.

2. The receiving unit driving control method according to claim 1, further comprising switching between a plurality of operating modes including the first driving control mode and the multistage driving control mode.

3. The receiving unit driving control method according to claim 2, further comprising operating the receiving unit in a second driving control of intermittently driving the receiving unit, wherein in the second driving control mode, the baseband processing circuit remains turned on for longer than the predetermined unit time, and the RF receiving circuit is turned on and off in accordance with the second intermittent driving pattern.

4. The receiving unit driving control method according to claim 2, wherein the switching between the plurality of operating modes includes determining which operating mode to operate the receiving unit in based on a receiving condition including at least a receiving signal intensity of the satellite signal.

5. The receiving unit driving control method according to claim 2, further comprising calculating a position based on the satellite signal received by the receiving unit,
    wherein the switching between the plurality of operating modes includes determining which operating mode to operate the receiving unit in based on whether calculation of the position has finished.

6. The receiving unit driving control method according to claim 1, further comprising controlling a duty ratio of the second intermittent driving pattern.

7. The receiving unit driving control method according to claim 1, wherein the first driving period of the first intermittent driving pattern is equal to or more than 20 ms, and
    wherein the second driving period of the second intermittent driving pattern is equal to or more than 1 ms and less than 20 ms.

8. A receiving device comprising:
    a receiving unit that receives a satellite signal from a positioning satellite; and
    a switching control unit that controls driving of the receiving unit by switching between a plurality of operating modes including:
        a first driving control mode in which a receiving circuit and a baseband processing circuit of the receiving unit are turned on and off together at the same time according to a first intermittent driving pattern having a first driving period of a predetermined unit time; and
        a multistage driving control mode in which the baseband processing circuit is turned on and off in accordance with the first intermittent driving pattern, and when the baseband processing circuit is turned on, the receiving unit is turned on and off according to a second intermittent driving pattern having a second driving period that is shorter than the predetermined unit time of the first driving period.

9. An electronic apparatus comprising the receiving device according to claim 8.

10. The receiving unit driving control method according to claim 1, further comprising:
    obtaining, by the receiving unit, ephemeris data,
    wherein the receiving unit is operated in the first driving control mode and the multistage driving control mode after the ephemeris data has been obtained.

* * * * *